United States Patent [19]

Leclercq et al.

[11] Patent Number: 4,599,213
[45] Date of Patent: Jul. 8, 1986

[54] NUCLEAR FUEL ASSEMBLY WITH REPLACEABLE FUEL ELEMENTS

[75] Inventors: Joseph Leclercq, St Didier Au Mont D'OR; Alain Gagnard, Lyon, both of France

[73] Assignee: Framatome et Cogema, France

[21] Appl. No.: 532,057

[22] Filed: Sep. 14, 1983

[30] Foreign Application Priority Data

Sep. 16, 1982 [FR] France .................. 8215664

[51] Int. Cl.⁴ .................................. G21C 3/32
[52] U.S. Cl. ......................... 376/446; 376/440
[58] Field of Search ............ 376/440, 446, 463

[56] References Cited

U.S. PATENT DOCUMENTS

| Re. 30,065 | 8/1979 | Anthony et al. | 376/435 |
|---|---|---|---|
| 3,015,616 | 1/1962 | Sturtz et al. | 376/440 |
| 3,255,091 | 6/1966 | Frisch | 376/446 |
| 3,828,868 | 8/1974 | Jabsen | 376/440 |
| 3,992,259 | 11/1976 | Anthony et al. | 376/440 |
| 4,036,692 | 7/1977 | Walton | 376/440 |
| 4,064,004 | 12/1977 | Long et al. | 376/440 |
| 4,292,130 | 9/1981 | Viaud et al. | 376/446 |
| 4,303,476 | 12/1981 | Leclercq | 376/446 |

*Primary Examiner*—Deborah L. Kyle
*Assistant Examiner*—Richard Wendtland
*Attorney, Agent, or Firm*—Larson & Taylor

[57] ABSTRACT

The assembly comprises fuel elements carried and retained by a structure comprising tie rods and end parts. Dismantable holding devices for the plug of at least one element are provided at one end part and comprise a threaded connection. They are actuatable without applying a high torque to the sheath of the fuel element and enable the element to be extracted across an end part.

9 Claims, 7 Drawing Figures

NUCLEAR FUEL ASSEMBLY WITH REPLACEABLE FUEL ELEMENTS

BACKGROUND AND SUMMARY OF THE INVENTION

The invention relates to a fuel assembly for a nuclear reactor of the type comprising fuel elements (generally constituted by nuclear fuel contained in a sheath) and a structure or framework constituted by parallel tie rods fixed to two end parts between which are distributed grids which cooperate with the end parts to hold the fuel elements in a regular network, generally square, of which some lattice sites are occupied by the tie rods.

Such assemblies are widely used in light water power reactors. It has already been proposed (French Pat. No. 2,368,785) to fix one of the end parts removably to tie rods so as to be able to remove it, then to extract at least some of the fuel elements, for example to examine or replace them. This solution has the drawback that, even to replace a single fuel element, it is necessary to dismount the end part, then to remount it, which constitutes a long and delicate operation.

Now it may be desirable to replace, in an assembly, a single fuel element. It is known, for example, that it may be useful to withdraw a fuel element to cause it to undergo destructive examination or to introduce it into a test loop. It is also known that it may be useful to temporarily place a fuel element containing a burnable poison, such as $Gd_2O_3$ or $B_4C$, in a network of fuel elements occupied by fuel material.

In addition, the construction of fuel assemblies provided to permit the replacement of at least one fuel element situated at a pre-determined location in the network enables a problem encountered in certain nuclear power stations to be easily solved. As a result of hydrodynamic phenomena, such as the presence of violent jets of water directed towards certain fuel elements through the seals of the baffle surrounding the core the reactor, these fuel elements are subjected to vibrations, a source of rupture.

The invention proposes to substitute, at these locations, strong elements, for example of steel, for the fuel elements. When the fuel assemblies are redistributed in the course of recharging core, the steel elements can be replaced by elements of an other type, for example fuel elements, to improve the neutron distribution in the core.

Accordingly, the invention provides in particular an assembly of the above-defined type in which, in at least one of the nodes of the element network, dismountable retaining means for the plug of the fuel elements are provided on one of the end parts, said means comprising a threaded connection actuatable without transmission of considerable torque to the sheath of the fuel element, and enabling the fuel element to be extracted across the part.

Fuel assemblies have already been proposed in which the fuel elements are screwed into the lower part and held elastically with respect to the upper part. To enable the dismounting of certain fuel elements, the latter are provided with a removable member engaging in the upper grid and enabling the fuel element to be extracted. This solution, in which all the fuel elements are held on the lower plate, has the serious drawback of requiring the application of a twisting torque on the fuel elements during their positioning and their removal (French Pat. No. 2,131,857).

This drawback is completely avoided in the case of the invention, applied to a fuel assembly where the intermediate grids participate in holding the fuel elements at the same time as centering them and where the possible twisting torques necessary to act on the threaded connection transmitted by means of the sheath are very highly attenuated.

The invention is capable of numerous embodiments. In particular the means may comprise a sleeve independent of the fuel elements, fastenable to the fuel element or the part by the threaded connection. In an other embodiment, the threaded connection is formed on an extension of the plug which can be screwed into the part, this extension being provided with means accessible from the outside of the assembly to receive a screwing and unscrewing tool.

The invention will be better understood on reading the description which follows of particular embodiments, given by way of non-limiting examples.

The description refers to the accompanying drawings.

SHORT DESCRIPTION OF THE DRAWINGS

FIG. 1 shows diagrammatically a fragment of a pressurized water nuclear reactor, in section along a plane perpendicular to the vertical axis of the reactor, FIG. 2 shows diagrammatically a fuel assembly to which the invention is applicable, in elevation, FIGS. 3, 4, 5, 6 and 7 are diagrams on an enlarged scale showing the retaining means of a dismountable fuel element in an assembly, according to five particular embodiments of the invention.

DETAILED DESCRIPTION OF PREFERRED EMBODIMENTS

Figure 1:
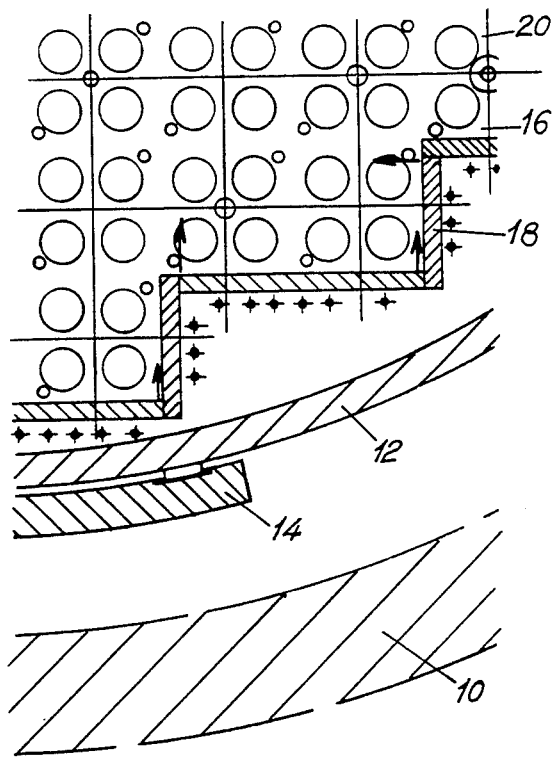

Before describing an assembly comprising at least one removable fuel element, the advantage of the invention in a particular reactor will be demonstrated, a fragment of said reactor being shown in FIG. 1.

This figure shows the tank 10 which bounds, with an inner jacket 12, an annular space occupied by water and, over a fraction only of the angular development of the jacket, by heat shields 14. The core 16, constituted by adjacent fuel assemblies, is surrounded by a partition or baffle constituted by flat panels such as 18 assembled at 90°. The pressure difference between the water coming from the exchangers, which flows down along the space comprised between the jacket and the partition, and the water which flows up through the core causes water jets, shown diagrammatically by arrows in FIG. 1, across the seals between the panels 18.

Figure 2:
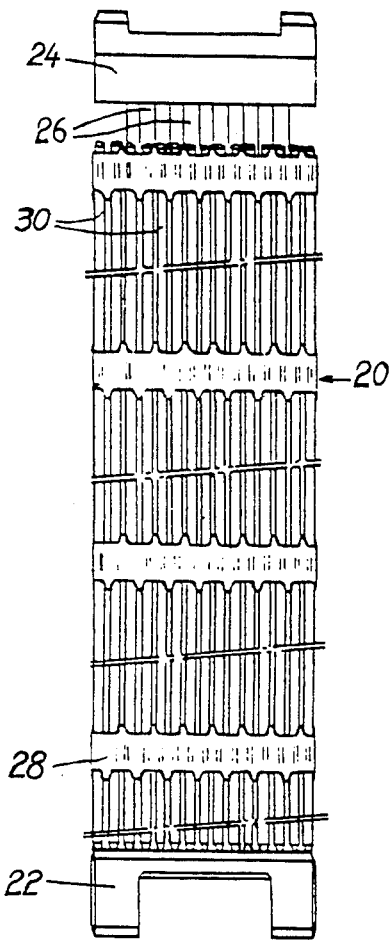
Figure 3:
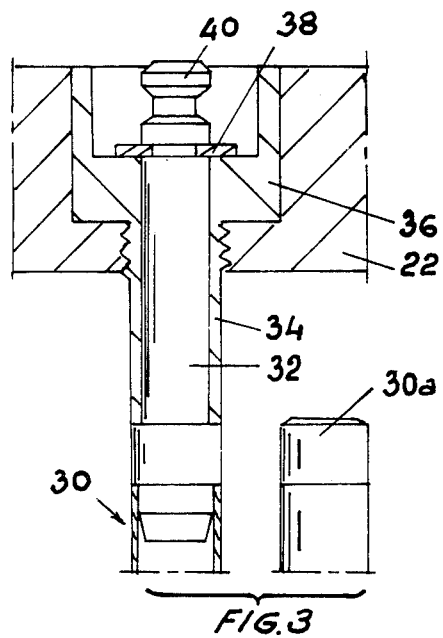

As is shown by FIG. 2, each assembly such as 20 comprises two end parts 22 and 24 joined by tie rods 26 which can also constitute guide tubes for the individual rods belonging to the control bars. On these tie rods 26 are fixed grids such as 28 which insure the holding of the fuel elements such as 30 at the nodes of a regular network.

The water jets passing through the vertical seals between panels 18 strike the fuel elements situated in the vicinity, that is to say at the corners of the assemblies and cause them to vibrate. These vibrations are transmitted to the grids and neighbouring fuel elements and can cause cracks or failures. These fuel elements can be identified very easily during manufacture of the assembly.

To avoid these fissurization problems, the invention proposes particularly to substitute, for the fuel elements located at the most exposed places, stronger elements, for example, elements constituted by steel tubes which withstand vibrations better than the zirconium alloy sheath of the fuel elements.

After loading the core, an assembly initially in the corner will be situated in the body of the core. To avoid the heterogenity of flow which the presence of the steel element at this location would cause, it is desirable to replace the steel element by a normal fuel element. To permit this replacement without a long and delicate operation on the assembly, it is desirable for the element located at the critical position to be provided with fixing means enabling it to be extracted and to be replaced through an end part, without removing the latter.

FIGS. 3 to 7 show various solutions enabling this result to be achieved.

In the embodiment shown in FIG. 2, the element 30 is fixed dismountably to the upper end part 22, but means which will be described and which would apply just as well to fastening to the lower part. The welded plug of this element 30 comprises a sufficiently long extension 32 to project into the part 22 when the element 30 is at the same level as the adjacent elements such as 30a. This extension, of smaller diameter than the plug, is slidably engaged in a small sleeve 34 having a threaded lower portion, designed to be fixed by screwing in a threaded hole of the part 22, and a top portion in the form of a cup 36. The extension 32 projects into this cup where it is held by a split washer 38. The threaded hole formed in the part 22 must obviously have a diameter at least equal to that of the element 30, to enable the withdrawal of the latter. In practice, it will often be advantageous to give the same diameter to the element and to the lower portion of the sleeve 34.

This sleeve is provided with means (not shown), such as notches, enabling it to be rotated by means of a suitable tool. The distance which separates the bottom of the cup 36 and the bottom section of the sleeve 34 is chosen so that the extension 32 is locked axially in the sleeve.

The method of positioning the element is immediately apparent: the assembly being placed in vertical position, the element is lowered by means of gripping means which comes to grip a terminal boss 40 of the extension 32, provided for this purpose.

The means are then replaced by a tool which rotates the sleeve 34 until it is screwed fully home. The bottom end of the element 30 remains free, as the same level as that given to the other elements 30a.

Figure 4:
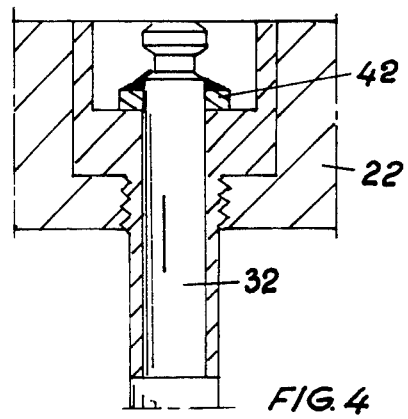

Removal is effected in reverse manner: the sleeve 34 is first disengaged by rotating it. Then the terminal boss 40 is gripped by means of the gripping means to extract the element 30 and the sleeve 34 as a unit. The modification of the embodiment shown in FIG. 4 fully differs from the preceding one by the method of fastening the sleeve and the plug. In the case of FIG. 4, this fastening is ensured by a washer 42 welded to the extension 32 and supported on the bottom of the cup 36. In the modification shown in FIG. 5, where members corresponding to those of FIGS. 3 and 4 bear the same reference numerals, the extension 32 of the plug is provided with a threading which cooperates with the tapping of the sleeve 34. The latter is simply slidingly engaged into a hole of the end part 22. However, the upper wall of the cup is constituted by a thin and deformable annular collar 44, which can be applied against an indentation of the receiving recess of the cup formed in the part 22.

As in the preceding case, no torque is exerted on the element. To withdraw the sleeve, the latter is rotated so as to bring back the collar 44 to the cylindrical state (shown diagrammatically in mixed lines in FIG. 5) and to withdraw it from the element. This operation can be carried out by using a rotary tool engaging in notches (not shown) of the cup 36 of the sleeve 34. The sleeve is then removed by means of a tool cooperating with means (not shown), provided on the cup 36, and a second tool, longer than that serving to screw or unscrew the sleeve, is driven in to seize the terminal boss of the plug of the element. An other solution consists to using a sufficiently long extension for it to reach the upper level of the sleeve.

Figure 6:
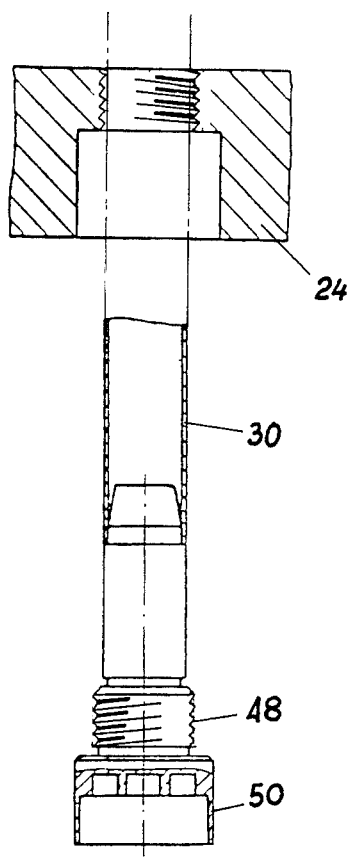
Figure 5:
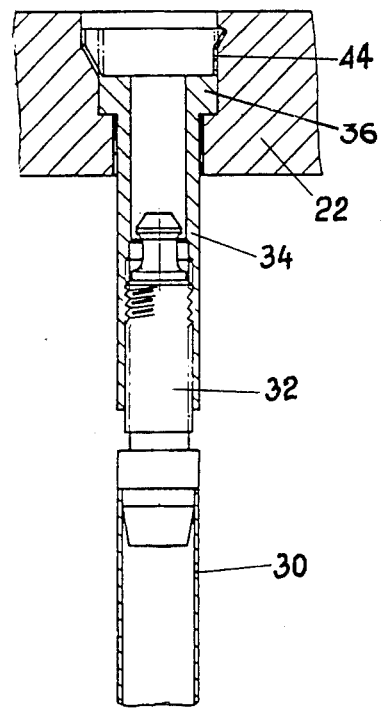

In the embodiment shown in FIG. 6, the element 30 is fixed removably to the lower end part 24 and extractable through this part. No intermediate sleeve is provided. The extension of the plug comprises a threaded portion 48 intended to be screwed directly to the end part 24 and a terminal head 50 of which the inner recess comprises notches enabling it to receive a screwing and unscrewing tool. An advantage of this solution is that the threaded connection is directly provided between a solid plug and the end part, whence a better mechanical behaviour. On the other hand, considering that the gripping torque is directly applied to the plug, it is preferably only to adopt this embodiment when the torque to be exerted remains moderate.

Figure 7:
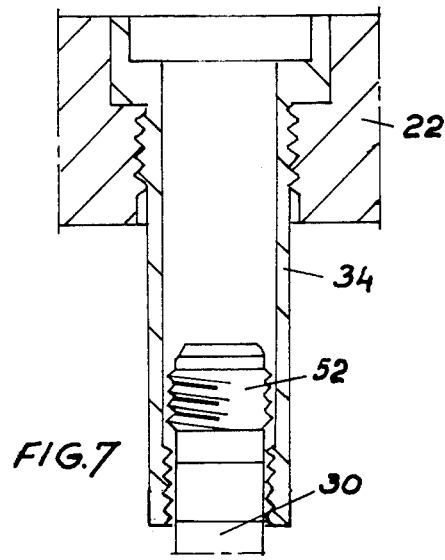

In the embodiment illustrated in FIG. 7, the element remains free to expand axially, since it is simply held, without being immobilized. Its centering and supporting mode is hence the same as that of the other elements of the network. For this, the plug of the element 30 is provided with threads 52 which cooperates with an inner thread formed in a sleeve 34. The threaded connection between this latter sleeve, which may have a constitution similar to those shown in FIGS. 3 and 4, and the end part 24 is of opposite direction to the thread 52. The inner and outer threads of sleeve 24 are placed at a distance such that the threaded connection between the sleeve and the element is disengaged before the threaded connection between the sleeve and the end part is completely engaged.

It is seen that this solution avoids any twisting in the element, on mounting and on dismantling, if each of the threads only engages once the other is disengaged.

We claim:

1. Fuel assembly for a nuclear reactor of the type comprising:
    a plurality of fuel elements each closed by end plugs; and
    a structure comprising (a) an upper end part; (b) a lower end part; (c) a plurality of parallel tie rods fixed to said end parts; (d) grids fixed to said tie rods, distributed between said end parts, and cooperating with the end parts to hold the fuel elements at the nodes of an array formed thereby and of which other nodes are occupied by the tie rods; and (e) releasable connection means for connecting rigidly and individually at least one of said fuel elements located at a predetermined one of said nodes to one of said end parts, said connection means including
    (i) an opening formed in said one of said end parts, aligned with said node and having a cross section sufficient for insertion and removal of said one of said fuel elements through said one of said end plates, and (ii) a retaining member insertable into said opening, said retaining member having an abutting connection with one of said fuel element and end part and a threaded connection with the other one of said fuel element and end part, said retaining member being shaped for engagement by a rotating tool from the outside of the fuel assembly, wherein said one of said fuel elements is connected to or disconnected from the associated end part without being subjected to a substantial torque exerted by said tool on said retaining member.

2. Assembly according to claim 1 wherein said releasable connection means are provided to receive an element of a nature other than a fuel element.

3. Assembly according to claim 1, wherein the plug of the element is provided with an extension provided with a threading cooperating with an internally threaded opening in the end part, which extension terminates in a head provided with receiving means for a screwing and unscrewing tool.

4. Assembly according to claim 1, wherein said retaining member comprises a sleeve separate from the fuel element, fastened to said one of said fuel element and end part by the threaded connection, and made fast permanently to one of the part and the element.

5. Assembly according to claim 4, wherein the sleeve is fastened to an extension of the element by the threaded connection and comprises a deformable annular collar which can be engaged in notches formed in the end part to lock the sleeve against rotation.

6. Assembly according to claim 4, wherein the sleeve is fastened to the end part by the threaded connection and the plug of the element is provided with an extension passing through the sleeve so as to be suspended on the sleeve in the axial direction while remaining free in rotation with respect to the sleeve.

7. Assembly according to claim 4, wherein the sleeve comprises a first threaded connection with the end part and a second threaded connection with an extension of the plug of the element, the elements of the threaded connections borne by the sleeve bring of opposite pitches, whereby rotation of the sleeve is either direction results in engagement of one of the threaded connections and simultaneous disengagement of the other one of said threaded connections.

8. Fuel assembly for a nuclear reactor of the type comprising:

a plurality of fuel elements each closed by end plugs; and a structure comprising (a) an upper end part; (b) a lower end part; (c) a plurality of parallel tie rods fixed to said end parts; (d) grids fixed to said tie rods, distributed between said end parts, and cooperating with the end parts to hold the fuel elements at the nodes of an array formed thereby and of which other nodes are occupied by the tie rods; and (e) releasable connection means for connecting rigidly and individually at least one of said fuel elements located at a predetermined one of said nodes to one of said end parts, said connection means including (i) an opening formed in said one of said end parts, aligned with said node, and having a cross section sufficient for insertion and removal of said one of said fuel elements through said one of said end plates, and (ii) a retaining sleeve having a threaded stem for insertion into said opening, an internal thread for connection with an externally threaded portion of an associated one of said end plugs of said one of said fuel elements, and a cup constructed and arranged for abutting connection against said one of said end parts and for engaging a deformable annular collar in notches formed in the end part to lock the sleeve against rotation.

9. A nuclear reactor core comprising:

a plurality of adjacent fuel assemblies located in upright position and surrounded by baffle means causing jets of coolant directed transversely to said core; and a fuel assembly for location in a corner of said core which receives the coolant jets comprising a plurality of fuel elements each closed by end plugs and a structure having (a) an upper end part, (b) a lower end part, (c) a plurality of parallel tie rods fixed to said end parts, (d) grids fixed to said tie rods, distributed between said end parts, and cooperating with the end parts to hold the fuel elements at the nodes of an array of which other nodes are occupied by the tie rods, and (e) releasable connection means for connecting rigidly and individually at least one of said fuel elements located at a predetermined one of said nodes to one of said end parts, said connection means including (i) an opening formed in said one of said parts, aligned with said node and having a cross section sufficient for insertion and removal of said one of said fuel elements through said one of said end plates, and (ii) a retaining member insertable into said opening, said retaining member having an abutting connection with one of said fuel element and end part and a threaded connection with the other one of said fuel element and end part, said retaining member being shaped for engagement by a rotating tool from the outside of the fuel assembly, wherein said one of said fuel elements is connected to or disconnected from the associated end part without being subjected to substantial torques exerted by said tool on said retaining member.

* * * * *